June 10, 1952
R. C. RUSSELL
2,599,724
SHIFT CONTROL MECHANISM
Filed Sept. 10, 1948
6 Sheets-Sheet 1
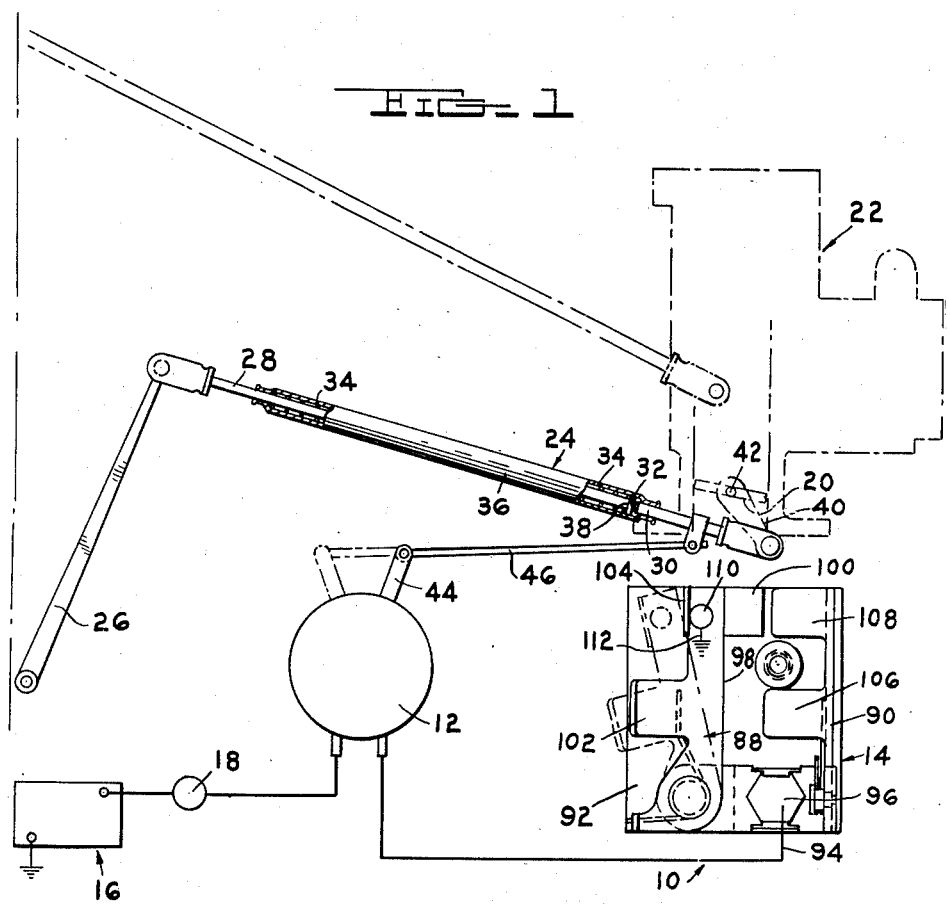
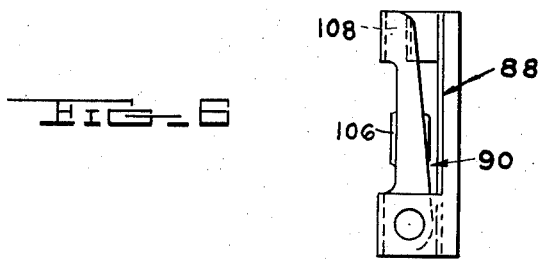
INVENTOR.
ROBERT C. RUSSELL
BY
*McDonald & Seagro*
ATTORNEYS

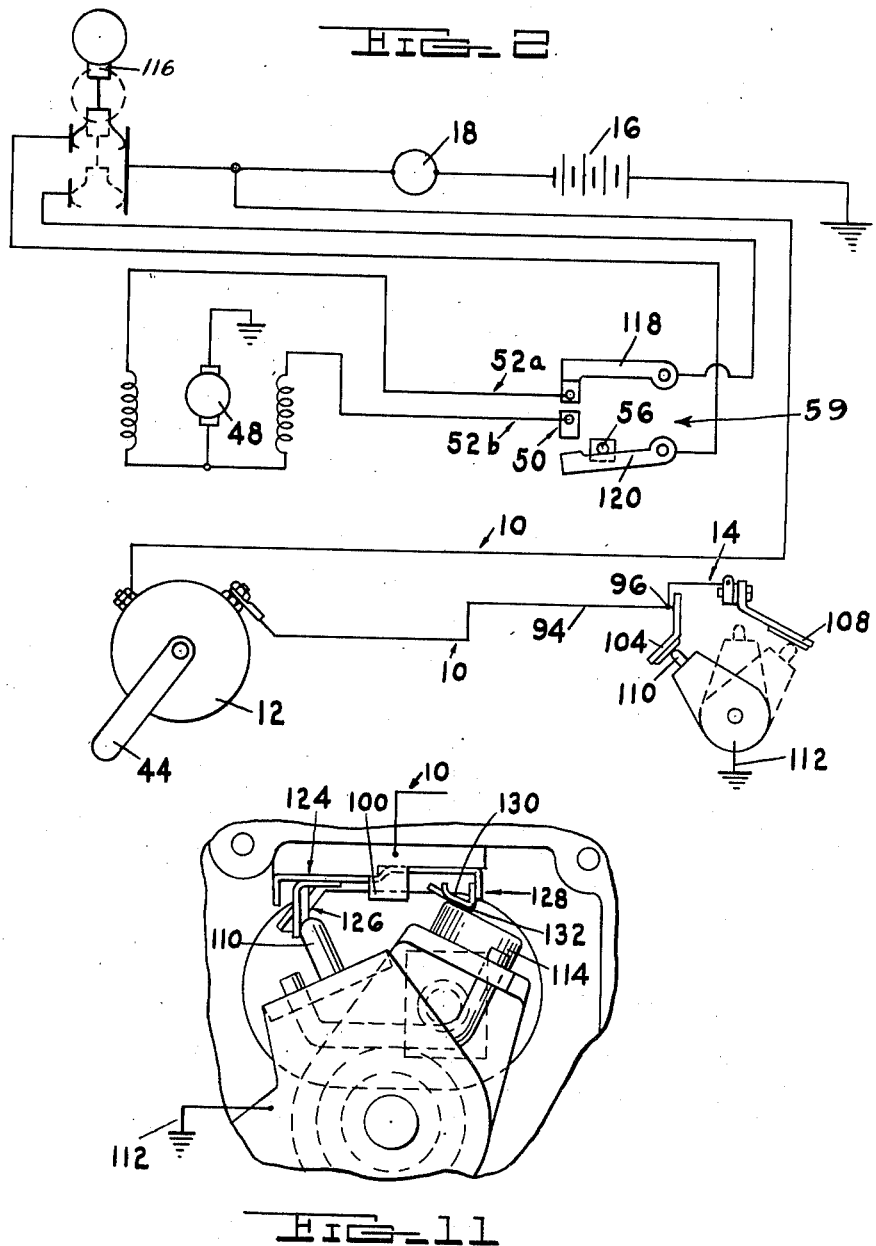

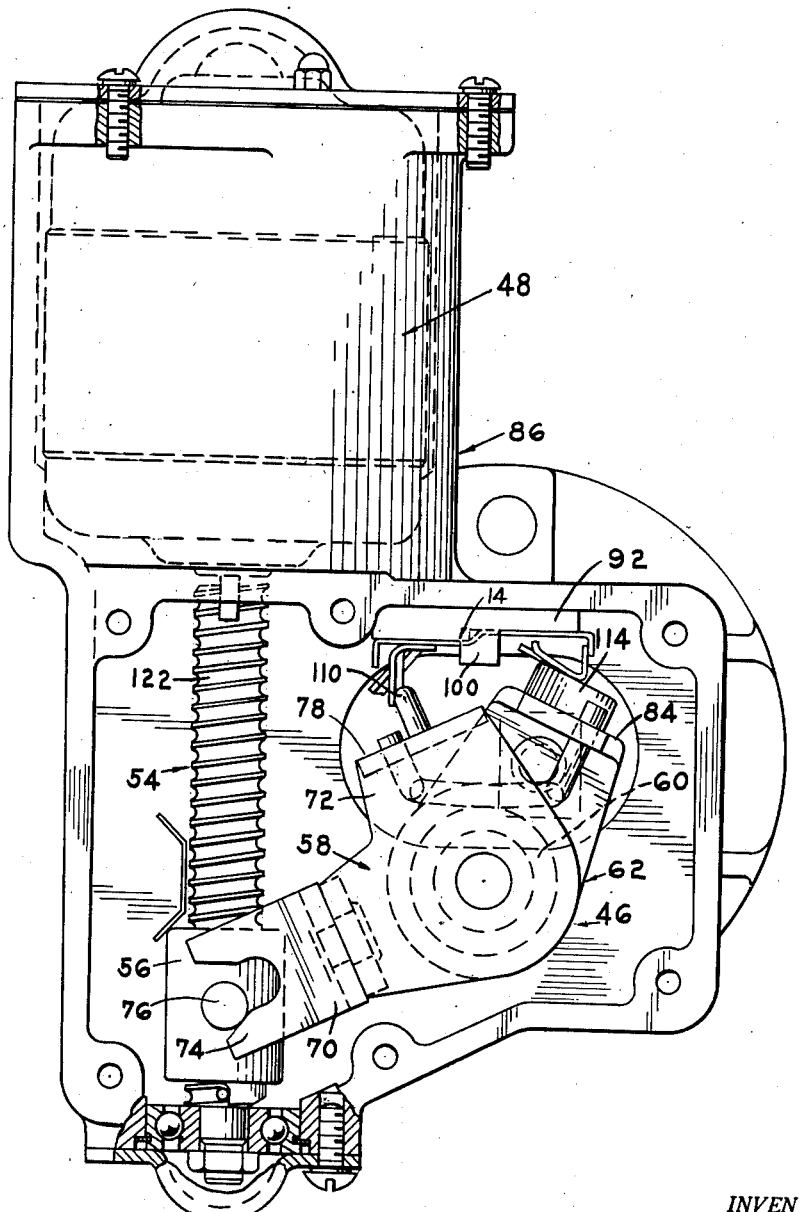

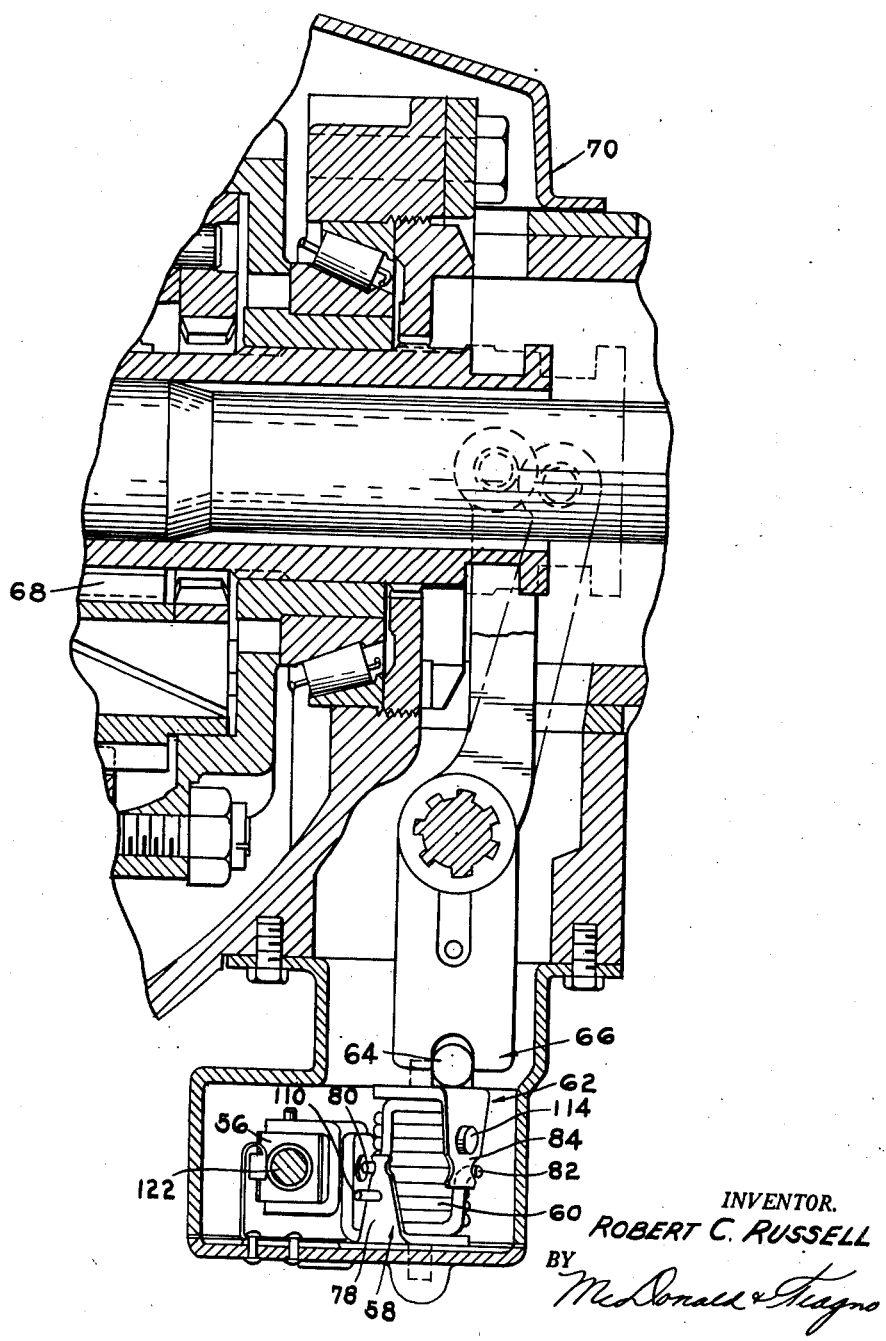

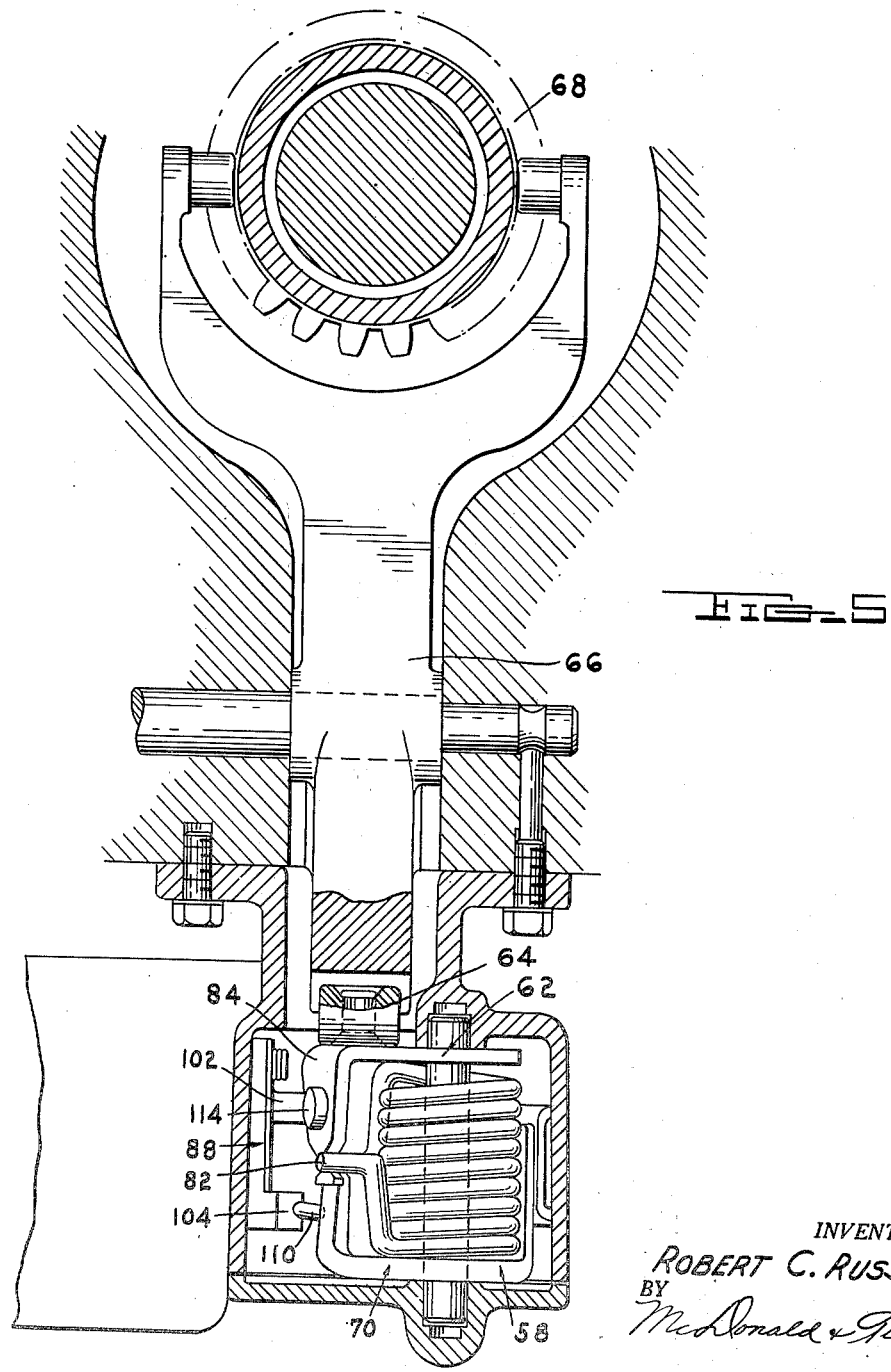

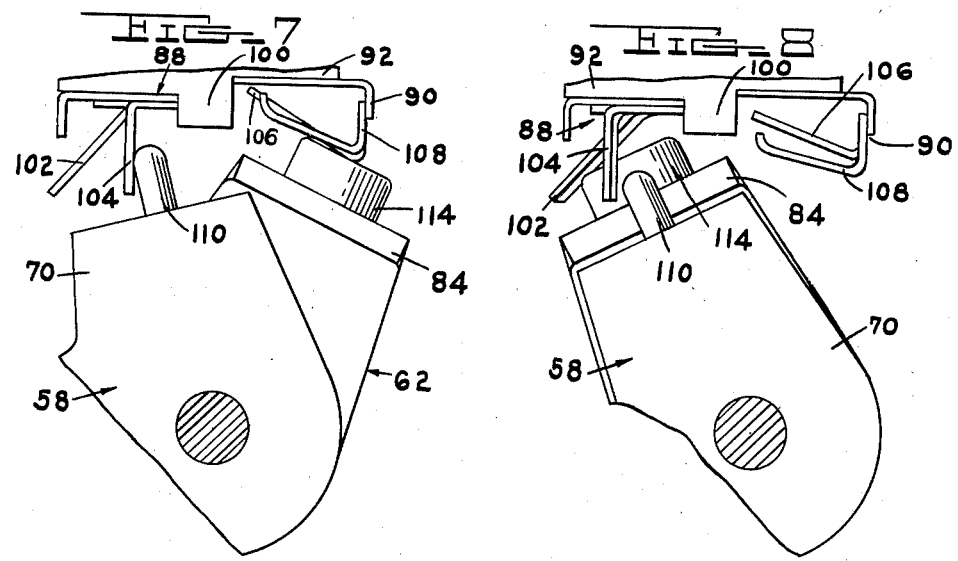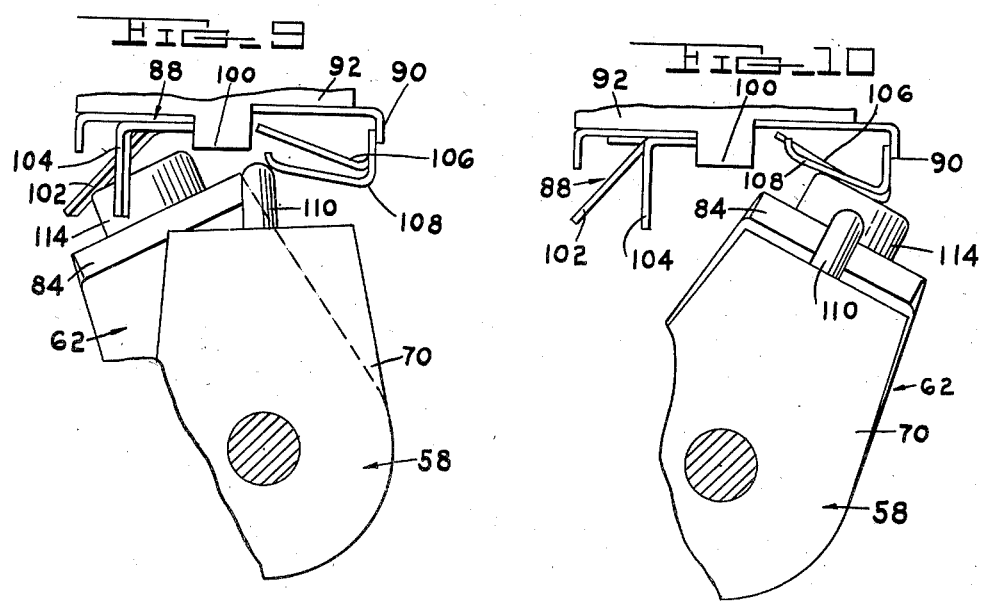

Patented June 10, 1952

2,599,724

UNITED STATES PATENT OFFICE 2,599,724

SHIFT CONTROL MECHANISM

Robert C. Russell, Cleveland Heights, Ohio, assignor to Eaton Manufacturing Company, Cleveland, Ohio, a corporation of Ohio Application September 10, 1948, Serial No. 48,713

10 Claims. (Cl. 74—472)

This invention relates to gear shifting mechanism and more particularly means associated therewith for quickly and effectively permitting a change speed gear operation.

Broadly, the invention comprehends the provision of automatic electrically operated engine throttle closing means controlled in sequence with gear shifting power actuating means for momentarily removing the engine torque delivered to the gears so as to effect a quick and positive shifting of the gears as desired.

An object of the invention is the provision of a completely electrical gear shifting mechanism that is simple of operation and quick and effective in said operation.

Another object of the invention is the provision of an automatic engine throttle closing means operated in conjunction with a simple button controlled gear shifting means providing for ease in the gear engaging thereof during a shift operation.

Another object of the invention is the provision of an engine throttle closing means associated with power operated gear shifting means for gears driven by the engine and controlled by the gear actuating or shifting means for momentarily closing the engine throttle to relieve the torque and to restore the throttle and/or torque at the proper time to effect a quick and easy shift from one speed ratio to another.

A yet further object of the invention is the electrical solenoid throttle controlling of an engine carburetor for momentarily interrupting the torque output thereof in correlated relation to a gear shifting mechanism for change speed gearing, said mechanism having switch means associated therewith forming a part of the electrical circuit for the solenoid for controlling the operation thereof.

A still further object of the invention is the provision of a completely electrically operated gear shifting and engine speed control mechanism operable in coordinated relation to permit of an easy, quick and effective gear shifting operation, thereby relieving the operator of the vehicle to which the mechanism is applied of the necessity to personally coordinate the engine throttling and gear shifting for a proper gear shifting operation.

Other objects and advantages of the invention will appear from the following description taken in connection with the drawings, forming a part of the specification, and in which:

Fig. 1 is a throttle closing device and control therefor as diagrammatically arranged in an electrical circuit therefor;

Fig. 2 is a diagrammatic illustration of an electric gear shifting system and an automatic electrically operated throttle closing mechanism associated therewith;

Fig. 3 is a plan view of power driven gear shifting mechanism in association with the control switch for the throttle closing mechanism;

Fig. 4 is a partially broken cross sectional view of the gear shifting mechanism, control switch, and the gear shifting lever;

Fig. 5 is a partially broken cross sectional view of the gear shifting mechanism, gear shift lever, and two-speed axle gearing controlled thereby;

Fig. 6 is a side plan view of the switch mechanism shown by Fig. 1;

Fig. 7 through Fig. 10 are progressive positions of the gear shifting mechanism of Fig. 3 with relation to the throttle closing switch mechanism; and Fig. 11 is a modified form of the throttle closing switch mechanism.

The present invention was conceived primarily for the purpose of eliminating to the maximum degree the human element of control or operation conventionally required in the shifting of gears in two-speed axle drives or the like. With the advent of electrically operated gear shifting mechanisms for variable speed transmissions such as two-speed axles or the like as represented by my co-pending application Serial No. 589,201, now Patent No. 2,462,779 issued February 22, 1949, it has additionally become necessary to relieve the torque being transmitted through the gears at the time that a gear change is desired so as to effect a quick and easy gear engagement and this is herein accomplished by synchronizing the throttling down or torque interruption of the engine driving the gearing system with the gear shifting mechanism, said torque interruption being accomplished by solenoid actuation.

The gear shifting mechanism has switch means associated therewith for controlling the circuit for the solenoid and is so arranged therewith as to effect a proper timing of the engine torque interruption to have it coincide with the full gear shifting operation. The engine is throttled down for a predetermined period of time dependent upon the time required for a completed shift and is preferably varied for different speed ratios, said timing being controlled through the provision of appropriate switching mechanism actuated by the gear shifting mechanism and forming a part of the electrical circuit for the solenoid.

Referring to the drawings for more specific details of the invention, 10 represents generally as shown by Fig. 1 an electrical circuit for a rotary solenoid 12 controlled primarily as by a switch mechanism 14. The source of electrical power for the circuit is derived from a storage battery 16 or other suitable source and is supplied thereto controlled as by an ignition switch or the like 18.

The solenoid 12 is adapted to serve the purpose of moving a throttle plate 20 of a conventional carburetor 22 associated with mechanism to be hereinafter defined. The throttle plate 20 forms a part of a throttling mechanism 24 associated with a conventional type of accelerator pedal, not shown, and comprising a throttle lever 26, telescoping links 28 and 30 normally held in abutting relation at point 32 by a compression spring 34 fitted intermediate a cylindrical housing 36 fixed to link 30 and an enlarged segment 38 arranged at the end of link 28, said link 28 being pivotally attached at its end opposite from segment 38 to lever 26 and link 30 being pivotally attached to a lever 40 fixedly secured at its other end to the pivot shaft 42 of throttle plate 20.

The output of rotary arm 44 of the solenoid is connected to link 30 by a link 46 arranged therebetween one end being pivoted at the free end of arm 44 and its other end pivotally clamped upon link 30, the purpose of which will hereinafter appear.

The switch mechanism 14 is associated with gear shifting mechanism 46 forming a part of an electric gear shifting system, said system being more fully disclosed in my co-pending application Serial No. 589,201, reference being had to Fig. 3 wherein the power driven means or electric motor 48 therefor is controlled for operation by a switch mechanism 50, said motor and switch forming a part of electrical circuits 52a and 52b, shown by Fig. 2.

The electric motor 48 which is of the reversible type is drivingly connected to the gear shifting mechanism 46 by a ball screw-nut power transmitting mechanism 54 more fully described in my Patent 2,446,393, the movement of nut 56 thereof being effective to move an input member 58 of the gear shifting mechanism for eventual transmission by torsion spring 60 to output member 62 mounted concentrically to member 58, said output member having an appropriate connection 64, of a swivel-barrel type, with a gear shifting lever 66 adapted to be movable between predetermined selected points for shifting the gears 68 of a two-speed axle or transmission 70.

The input member includes a pair of arms 70 and 72, arm 72 having a slotted end 74 receiving a pin 76 extending from nut 56 for movable engagement therebetween, and arm 70 including an axial portion 78 slotted on opposite sides thereof for receipt of the ends 80 and 82 of spring 60.

The output member 62 includes an axial portion 84 extended in overlapping relation to portion 78 of arm 70 of the input member and having slotted sections for receipt similarly to portion 76 the respective ends of spring 60.

The input and output members 58 and 62 respectively comprise the controlling elements for the automatic timed sequence operation of electric circuit 10 through their association with switch mechanism 14.

The switch mechanism 14 is insulatedly mounted in a housing 86 in which the motor 48, ball screw-nut mechanism 54, and gear shifting mechanism 46 are enclosed and comprises a pair of pivoted switch arms 88 and 90 respectively mounted upon an insulator block 92 and being supplied electric current through their terminal pivots from lead line 94 extending between the solenoid and terminal post 96.

The arm 88 is mounted as to be pivoted in a direction parallel or sideways to the block 92, and the arm 90 is pivotal perpendicular or up and down to the block. The arms 88 and 90 respectively are normally spring pressed to full line position shown by Figs. 1 and 6, arm 88 having one side 98 thereof in abutting relation upon a raised portion 100 of block 92.

Arm 88 has extending therefrom a pair of fingers 102 and 104 respectively, finger 102 being located intermediate the length of the arm and finger 104 being positioned at the free extremity thereof, the purpose of which will hereinafter appear.

Arm 90 similarly to arm 88 has a pair of fingers 106 and 108 respectively extending therefrom with finger 106 intermediate the length thereof and finger 108 at its free extremity.

The axial portion 78 of arm 72 of input member 58 has arranged extending radially therefrom a contactor pin 110 that is adapted to have electrical power transmitting engagement with fingers 104 and 108 in the course of its path of travel with input member 58 upon the oscillation thereof. The pin 110 is grounded through input member 58 and is so shown diagrammatically at 112 of Fig. 1.

The axial portion 84 of output member 62 has extending radially therefrom a bumper 114 of non-conduction material effective upon movement with output member 62 during the operational oscillation thereof to be engageable with fingers 102 and 106 for disrupting electrical contact between pin 110 and the respective fingers 104 and 108 as the case may be.

The electrical circuits 10, 52a and 52b are diagrammatically illustrated by Fig. 2 wherein they are both connected to the same power source controlled as by ignition switch 18.

The circuits 52a and 52b for the motor 48 are controlled in addition to limit switch mechanism 50 and ignition switch 18 by a gear shift control switch 116 adapted to be controlled by the vehicle operator in the selection of the gearing drive desired whether it be high or low.

The limit switch is of the type comprising a pair of switch blades 118 and 120 adapted to be engaged by an insulated portion of nut member 56 at the respective ends of its travel to break electrical power transmitting contact of one or the other of blades 118 or 120 to break the circuit in one direction to the motor at the completion of an oscillatory movement of the input member 58 of the gear shifting mechanism 54.

With reference to Fig. 2 taken together with the major elements to be operated through their incorporation in the electrical circuits and as more fully described by the several other figures and with the ignition switch in position, an operational interpretation of the system can be diagrammatically explained.

Assuming that the gear shift control switch as shown by full lines in Fig. 2 is in high gear position and the shift has been completed wherein the motor has caused a movement of the nut 56 of the screw-nut mechanism to the end of its travel in one direction effecting an oscillation of input member 58 and a shutting off of the motor upon the breaking of circuit 52b by the disengagement of blade 120 from its electrical power transmitting position, the contact pin 110 on the axial portion of input member 58 makes electrical contact with finger 104 of switch arm 88 thus effecting a supply of electrical current to solenoid 12 for the actuation of the solenoid. Upon the energization of the solenoid, the arm 44 thereof is moved to the full line position of Fig. 1 thereby closing the throttle plate against the resistance of spring 34 so as to offset the normal throttle opening position that may have been in effect at this stage of engine and vehicle operation. With the closing of the throttle plate, the torque output of the engine is interrupted resulting in the relief of torque from the gears of the two-speed axle permitting of the actuation of gear shift mechanism, upon the movement of the output member induced by torsion spring 60 preloaded by the movement of input member 58. As the output member oscillates and after a predetermined distance of such oscillation of input member 58, bumper 114 on axial portion 84 engages finger 102 and causes a sideways movement of switch arm 88 out of engagement with pin 110 on axial portion 78 of input member 58 to thus break the electrical circuit 10 and permit a restoration of the solenoid and throttle plate to normal positions coinciding wiith the accelerator pedal position as actuated by the vehicle operator. It is to be recognized that the torque to the gears is interrupted for a lapse of time until almost a complete gear shift is made thereby affording ease in effecting a proper shift to high gear.

After the shift to high has been completed the various switch elements, gear shift control switch 116, motor limit switch 50, and solenoid operation switch 14 are in position for a subsequent shift to low gear as is brought about by gear shift control switch being moved to low gear position indicated by dotted lines in Fig. 2. With the shift to low the circuit 52a to motor 48 is completed through switch blade 118 thereby energizing the motor effective to rotate the screw 122 of screw-nut mechanism 54 in a reverse direction to its previous operational movement. As the screw rotates, the nut 56 moves axially thereon initially acting to release switch blade 120 and permitting same to move to closed position while simultaneously oscillating input member 58 effective to load torsion spring 60 against the resistance offered to oscillation by output member 62, output member 62 being resisted in turn by the torque being transmitted through the gears of the two-speed axle 70. The continued rotation of motor 48 and axial movement of nut 56 associated therewith results in the continued movement of the nut to its other extreme position on the screw at which point it engages blade switch 118 breaking the circuit to the motor thus causing a shutting off thereof. In the course of travel of nut 56 toward blade switch 118, the input member 58 is oscillated through a predetermined arc such that pin 110 engages finger 108 of switch arm 90 thereby completing the electrical circuit to solenoid 12. Upon the energization of the solenoid, the throttle plate is moved to closed position effective to interrupt the torque output of the engine and a consequent relief of torque on the gears of the axle thereby permitting a shifting of the gears to low. It is to be noted that the contact of pin 110 against finger 108 provides for a proper solenoid and throttle closing operation similarly to the throttle control for the shift to high so as to permit of an effective shift operation.

Concomitantly with the relief of torque and the movement of output member 62 to shift lever 66 for a low gear drive, the bumper 114 on output member 26 engages finger 106 and moves it up and out of the normal path of pin 110 on input member 58 so as to permit of a subsequent shift of the input member without contacting therewith.

Figs. 7 through 10 illustrate the various positions of the input and output members at the completion of their oscillation in both directions with relation to the switch mechanism 14.

Fig. 11 illustrates a modified form of switch 14 and is designated generally by the numeral 124, said switch being insertable for use in place of switch 14 where it is desired to effect a throttle closing of limited duration for the shift to low because of the inherently rapid shift that normally occurs at low gear speeds.

Arm 126 of the switch is identical to arm 88 of switch 14 whereas arm 128 is provided with shorter fingers 130 and 132 as compared to arms 106 and 108 of switch 14. For all general purposes the operational control of circuit 10 by switch 124 would be the same as that by switch 14; and, therefore, additional operational description is omitted.

While this invention has been described in connection with certain specific embodiments, the principle involved is susceptible of numerous other applications that will readily occur to persons skilled in the art. This invention, therefore, is limited only as indicated by the scope of the appended claims.

What I claim is:

1. In combination an engine, an engine throttle, a variable speed transmission driven by said engine, power actuated gear shifting mechanism for said transmission, electrically operated means for shifting said throttle to closed position, an electric circuit for said throttle shifting means, and a control switch for said circuit, said gear shifting mechanism comprising an input member and an output member, each independently engageable with the control switch for controlling the period of operation of the circuit.

2. In combination an engine, an engine throttle, a variable speed transmission driven by said engine, power actuated gear shifting mechanism for said transmission, power operated means for shifting said throttle to closed position, and means for controlling the operation of the throttle shifting means, said gear shifting mechanism comprising an input member and an output member, each operably engageable successively with the control means for shifting the throttle for controlling the period of throttle closing in accordance with gear shifting requirements.

3. In combination an engine, an engine throttle, a variable speed transmission driven by said engine, electrical power actuated gear shifting mechanism for said transmission, said gear shifting mechanism comprising an input member, an output member and torsion spring means connecting the members together, electrical power actuated means for shifting the throttle to closed position, and switch control means for the throttle shifting means, the input member of the gear shifting mechanism cooperating with the switch control to cause a throttle closing operation and the output member cooperating with the switch control to disrupt the throttle closing operation.

4. In combination an engine, an engine throttle, a variable speed transmission driven by the engine, a power actuated power storing gear shifting mechanism for the transmission, a throttle controlling electrical circuit, a solenoid in the circuit for shifting the throttle to engine idling position, and a control means for the circuit engageable by the gear shifting mechanism for effecting a throttle closing operation, in one gear shifting position, of predetermined duration, and a throttle closing operation in another gear shifting position, of lesser duration.

5. In combination an engine, an engine throttle, a variable speed transmission driven by the engine, a gear shifting mechanism for the transmission comprising a power actuated input member, an output member associated therewith and spring means for transmitting the delivered power from the input to the output member, power actuated means for shifting the throttle to engine idling position, and control means for said power means actuated by the successive movement of the input and output members of the gear shifting mechanism for effecting a predetermined elapsed period of throttle closing in timed sequence with gear shifting of the transmission.

6. In combination an engine, a throttle therefor, an accelerator pedal, a lost motion connection between the accelerator and throttle normally spring pressed to accelerator operating position, an electric current energized solenoid for shifting the throttle to engine idling position against the resistance of the spring pressed lost motion connection, a variable speed transmission driven by said engine, means for controlling the energization of the solenoid and gear shifting mechanism for the transmission comprising an input member and an output member associated therewith, the input member actuating the solenoid energization control means for the energization of the solenoid to close the throttle and the output member subsequently to the input member actuating the solenoid energization control means for the deenergization of the solenoid and the restoration of the throttle to normal acceleration actuated position.

7. In combination an engine, a throttle therefor, a manual throttle pedal, a lost motion connection between the throttle and pedal, a spring normally eliminating the lost motion of the connection, a solenoid for shifting the throttle to engine idling position against the resistance of the spring of the lost motion connection, an electrical power supplied circuit for the solenoid, a variable speed transmission driven by said engine, an electric switch for controlling the electrical circuit comprising a pair of pivotal electrical current conducting arms and gear shifting mechanism for the transmission comprising a power actuated input member, an output member associated therewith, and spring means for transmitting the power from the input to the output member, said input member engageable with the switch arms to cause energization of the solenoid and the output member engageable with the switch arms to deenergize the solenoid.

8. In combination an engine, a throttle therefor, a manual throttle pedal, a lost motion connection between the throttle and pedal, a spring normally eliminating the lost motion of the connection, a solenoid for shifting the throttle to engine idling position against the resistance of the spring lost motion connection, an electrical power supplied circuit for the solenoid, a variable speed transmission driven by said engine, a switch for controlling the energization of the solenoid comprising a pair of current conducting members, and gear shifting mechanism for the transmission comprising a power actuated input member, an output member associated therewith and means intermediate the input and output members for transmitting the power from one to the other, said input member having a part engageable with the switch arms for completing the circuit for the energization of the solenoid for selected shift operations and said output member having a part engageable with the switch arms to break the circuit between the input member and switch arms.

9. In combination an engine, a throttle therefor, a manual throttle pedal, a lost motion connection between the throttle and pedal, a spring normally eliminating the lost motion of the connection, a solenoid for shifting the throttle to engine idling against the resistance of the spring of the lost motion connection, an electrical power supplied circuit for the solenoid, a variable speed transmission driven by said engine, a switch for controlling the energization of the solenoid comprising a pair of current conducting members, and gear shifting mechanism for the transmission comprising a power actuated input member, an output member associated therewith and means intermediate the input and output members for transmitting the power from one, to the other, said input member having a part engageable with one switch arm for completing the solenoid circuit near the completion of its power actuated movement for one shift operation and said part being engageable with the other switch arm for completing the solenoid circuit near the completion of another power actuated shift operation and said output member having a part engageable with the switch arms subsequently successively to the part on the input member to break the solenoid circuit near the completion of its gear shifting and mating operation.

10. In combination an engine, a throttle therefor, a manual throttle pedal, a lost motion connection between the throttle and pedal, a spring normally eliminating the lost motion of the connection, a solenoid for shifting the throttle to engine idling position against the resistance of the spring of the lost motion connection, an electrical power supplied circuit for the solenoid, a variable speed transmission driven by said engine, a switch for controlling the energization of the solenoid comprising a pair of current conducting members, and gear shifting mechanism for the transmission comprising a power actuated input member, an output member associated therewith and means intermediate the input and output members for transmitting the power from one to the other, said input member having a part engageable with one switch arm for completing the solenoid circuit near the completion of its power actuated movement for one shift operation, and said part having solenoid circuit make and break engagement with the other switch arm near and at the completion of its power actuated movement and said output member having a part engageable with the first switch arm subsequent successively to the part on the input member to break the solenoid circuit between the input member and first switch arm near the completion of one gear shifting operation and said part on the output member being engageable with the second switch arm near the completion of another shift operation subsequent to the engagement and disengagement of the part on the input member to move the second switch arm out of the path of the part on the input member upon its next subsequent movement.

ROBERT C. RUSSELL.

REFERENCES CITED

The following references are of record in the file of this patent:

UNITED STATES PATENTS

| Number | Name | Date |
|---|---|---|
| 1,891,678 | Maybach | Dec. 20, 1932 |
| 2,106,607 | Kelley | Jan. 25, 1938 |
| 2,195,365 | Getaz | Mar. 26, 1940 |
| 2,252,009 | Kenny | Aug. 12, 1941 |
| 2,322,479 | Schjolin | June 22, 1943 |
| 2,323,202 | Christian | June 29, 1943 |
| 2,373,453 | Brunken | Apr. 10, 1945 |